United States Patent [19]

Mateja

[11] Patent Number: 5,325,891
[45] Date of Patent: Jul. 5, 1994

[54] HYDRAULIC VALVE

[75] Inventor: Ernst Mateja, Neunkirchen, Fed. Rep. of Germany

[73] Assignee: Ecker Maschinenbau GmbH, Neunkirchen-Heinitz, Fed. Rep. of Germany

[21] Appl. No.: 1,205

[22] Filed: Jan. 6, 1993

Related U.S. Application Data

[63] Continuation of Ser. No. 539,374, Jun. 18, 1990, abandoned, which is a continuation of Ser. No. 426,508, Oct. 23, 1989, abandoned, which is a continuation of Ser. No. 331,053, Mar. 28, 1989, abandoned, which is a continuation of Ser. No. 89,240, Aug. 25, 1987, abandoned.

[30] Foreign Application Priority Data

Aug. 28, 1986 [DE] Fed. Rep. of Germany ....... 3629318
Jul. 3, 1987 [DE] Fed. Rep. of Germany ....... 3722053

[51] Int. Cl.⁵ .............................................. F16K 11/07
[52] U.S. Cl. .................... 137/625.48; 137/625.68; 251/325; 251/900
[58] Field of Search ............... 137/625.48, 625.68; 251/900, 325

[56] References Cited

U.S. PATENT DOCUMENTS

| | | | |
|---|---|---|---|
| 2,961,001 | 11/1960 | Pippenger | 137/625.63 |
| 3,140,728 | 7/1964 | Webb | 137/625.69 |
| 3,744,523 | 7/1973 | Hill | 137/625.68 |
| 3,819,152 | 6/1974 | Clippard | 251/900 |
| 3,949,645 | 4/1976 | Masclet | 137/625.66 X |
| 3,996,965 | 12/1976 | Peters | 137/625.66 |
| 4,524,803 | 6/1985 | Stoll et al. | 137/625.66 X |

FOREIGN PATENT DOCUMENTS 1550590 10/1969 Fed. Rep. of Germany ...... 251/325
61867 4/1982 Japan ................. 137/625.66

Primary Examiner—Gerald A. Michalsky
Attorney, Agent, or Firm—Darby & Darby

[57] ABSTRACT

A hydraulic valve wherein the at least partially cylindrical internal surface of a cylinder or the at least partially cylindrical external surface of a piston in the cylinder is formed with a slot-shaped circumferentially extending outlet communicating with a plenum chamber. The other surface is formed with a circumferentially extending groove for a portion of a one-piece or composite sealing ring. The piston is movable in the cylinder between at least one first position in which the ring sealingly engages the slotted surface at one side of the outlet and at least one second position in which the ring sealingly engages the slotted surface at the other side of the outlet. That portion of the slotted surface which is adjacent the outlet is rounded, and that portion of the grooved surface which is adjacent the groove is also rounded. The ring seals the outlet from a discharge opening in one of its positions or it seals the outlet from a first discharge opening in one position and from a second discharge opening in the other position with reference to the cylinder.

8 Claims, 8 Drawing Sheets

HYDRAULIC VALVE

This application is a continuation of application Ser. No. 07/539,374, filed Jun. 18, 1990, now abandoned, which is a continuation of application Ser. No. 07/426,508, filed Oct. 23, 1989, now abandoned, which is a continuation of application Ser. No. 07/331,053, filed Mar. 28, 1989, now abandoned, which is a continuation of application Ser. No. 07/089,240, filed Aug. 25, 1987, abandoned.

BACKGROUND OF THE INVENTION

The invention relates to improvements in hydraulic valves, and more particularly to improvements in hydraulic valves of the type wherein an outer or first component (e.g., a substantially cylindrical valve housing or body) has an at least partially cylindrical internal surface adjacent the at least partially cylindrical external surface of a second or inner component, e.g., a piston which is reciprocable in the outer component.

It is customary to provide in one of the internal and external surfaces an outlet which is in communication with a plenum chamber and is or can be sealed from at least one discharge opening in at least one first position of the piston but is free to communicate with such discharge opening in at least one second position of the piston. To this end, the other of the internal and external surfaces is provided with a groove for a sealing element which engages the one surface and is caused to slide across the outlet during movement of the piston between its first and second positions, i.e., the sealing element is located at one side of the outlet in the first position of the piston and at the other side of the outlet in the second position of the piston.

As the sealing element moves across the outlet, it rubs against those portions of the one surface which immediately surround the outlet so that it undergoes extensive wear. In fact, the sealing element can be completely destroyed by tearing or squashing as a result of repeated expansion and contraction as it travels across the outlet. Attempts to avoid rapid and excessive wear upon and extensive damage to or total destruction of the sealing element include the provision of an annular plenum chamber and a set of radial bores which terminate at the one surface and together constitute the outlet of the plenum chamber. The plenum chamber can be provided in the piston and the bores then extend radially outwardly to the external surface of the piston, or the plenum chamber can be provided in the cylinder and the bores then extend radially inwardly to the internal surface. Such solution is often quite unsatisfactory because the combined cross-sectional area of the bores (i.e., the cross-sectional area of the outlet) is too small. Moreover, the cost of making bores in the external surface of the piston or in the internal surface of the housing with a requisite degree of accuracy is high.

OBJECTS AND SUMMARY OF THE INVENTION

An object of the invention is to provide a hydraulic valve wherein the sealing element or elements can stand extensive wear in spite of the fact that the outlet of the plenum chamber need not be formed by bores.

Another object of the invention is to provide a hydraulic valve wherein the sealing element or elements can stand extensive wear even though the outlet of the plenum chamber extends or can extend circumferentially all the way around the inner component of the valve.

A further object of the invention is to provide the valve with a novel and improved outer component and with a novel and improved inner component.

An additional object of the invention is to provide the valve with novel and improved means for prolonging the useful life of its sealing element or elements.

Still another object of the invention is to provide a hydraulic valve which can employ any one of a wide variety of sealing elements with the same, or nearly the same, degree of efficiency.

A further object of the invention is to provide the valve with novel and improved means for regulating the flow between the outlet or outlets of one or more plenum chambers and one or more discharge openings in the form of ports or the like.

Another object of the invention is to provide novel and improved means for maintaining the sealing element or elements of the above outlined valve in sealing engagement with the inner and outer components.

The invention is embodied in a hydraulic valve which comprises an outer component having an at least partially cylindrical internal surface and an inner component having an at least partially cylindrical external surface adjacent the internal surface of the outer component. One of these surfaces has a slot-shaped outlet and the respective component defines a plenum chamber in communication with the outlet. The other surface has a groove and the valve further comprises a sealing element which is disposed in the groove and contacts the one surface. At least one of the outer and inner components is movable with reference to the other component between a first position in which the sealing element is located at one side of the outlet and a second position in which the sealing element is located at the other side of the outlet, i.e., the sealing element must move across the outlet or vice versa.

The groove is preferably an annular groove and the sealing element can comprise an O-ring, an annular lip seal or a composite annular seal.

The outlet can constitute a circumferentially complete annular slot.

The one surface can include a substantially rounded portion (this term is intended to embrace facetted, convex and like portions) adjacent at least one side of the outlet to reduce the likelihood of wear upon the sealing element. Furthermore, the other surface can include a substantially rounded portion adjacent at least one side of the groove.

The one component can comprise two sections which flank the slot-shaped outlet and means for connecting the sections to each other. Such connecting means can comprise threaded fastener means.

The component which has the one (slotted) surface can include means (e.g., one or more distancing elements) for varying the width of the slot-shaped outlet.

The sealing element is preferably a ring, and the width of the groove can be selected in such a way that the ring is maintained in the groove in axially stressed condition. Such groove can include a (deepmost) portion which is spaced apart from the one surface, and the ring is disposed between such deepmost portion and the one surface. The component having the other (grooved) surface is then further provided with means (e.g., a set of channels or bores) for communicatively connecting the deepmost portion of the groove with the plenum chamber, and such hydraulic valve can further comprise check valve means which is provided in the connecting means and is operative to prevent flow of hydraulic fluid from the deepmost portion of the groove to the plenum chamber or to the source of hydraulic fluid.

The outer component can include or constitute a cylinder, and the inner component can comprise or constitute a piston or plunger which is reciprocable in the cylinder.

The outlet can be disposed in a first plane and the groove can be disposed in a second plane which is parallel or nearly parallel to the first plane. The inner component is preferably reciprocable or otherwise movable in directions substantially at right angles to these planes.

The novel features which are considered as characteristic of the invention are set forth in particular in the appended claims. The improved valve itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
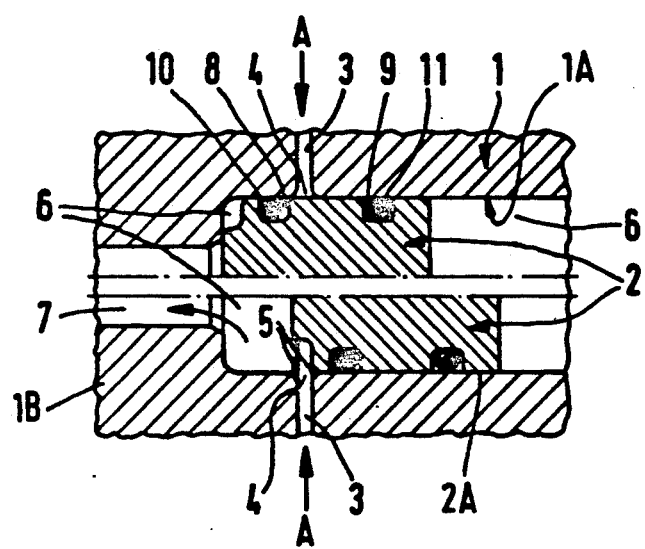
FIG. 1 is a fragmentary axial sectional view of a hydraulic valve which embodies one form of the invention and wherein the slot-shaped outlet of the plenum chamber is provided in the internal surface of the outer component, the inner component being shown in a first position with the left-hand sealing element at one side and in a second position with the left-hand sealing element at the other side of the outlet.

FIG. 1 shows a portion of a hydraulic valve including an outer component 1 which can constitute a hollow cylindrical valve housing or body having an at least partially cylindrical internal surface 1A, and an inner component 2 in the form of a piston having an at least substantially or partially cylindrical external or peripheral surface 2A which is adjacent the internal surface 1A. The piston 2 is reciprocable axially between a first position which is shown in the upper half and a second position which is shown in the lower half of FIG. 1. A coil spring (not shown) or any other suitable resilient element is interposed between the left-hand end wall 1B of the outer component 1 (hereinafter called cylinder for short) and the respective end face of the piston 2 to continuously bias the piston to the position which is shown in the lower half of FIG. 1 and in which the piston enables a slot-like annular outlet 4 of a plenum chamber 3 in the cylinder 1 to communicate with a discharge opening 7 in the end wall 1B. The arrows A indicate the directions in which a pressurized hydraulic fluid can flow from a suitable source (not shown), such as a pump, into the plenum chamber 3. In the position which is shown in the upper part of FIG. 1, an intermediate portion of the peripheral surface 2A of the piston 2 is surrounded by the outlet 4 and the latter is sealed from the discharge opening 7 in the end wall 1B by an annular sealing element 10 in the form of an O-ring which is partially recessed into a circumferentially extending groove 8 in the peripheral surface 2A. That portion (5) of the internal surface 1A which is adjacent the outlet 4 is rounded, e.g., chamfered, facetted or otherwise shaped to deviate from a truly cylindrical surface and to provide a more or less gradual transition between the major portion of the surface 1A and the surface bounding the slot-shaped outlet 4. Analogously, the peripheral surface 2A has a portion which is adjacent the groove 8 and is rounded (e.g., facetted, chamfered or configured in a similar way) to provide a rather smooth transition between the major portion of the surface 2A and the surface bounding the groove 8.

The right-hand portion of a chamber 6 which is surrounded by the internal surface 1A and reciprocably receives the piston 2 is or can be filled with a pressurized fluid which urges the piston 2 to its left-hand end position shown in the upper part of FIG. 1.

The peripheral surface 2A is further formed with a second circumferentially complete groove 9 for a second ring-shaped sealing element 11 which is or can be identical with the sealing element 10 and bears against the internal surface 1A. The sealing element 10 normally prevents leakage of hydraulic fluid between the discharge opening 7 and the outlet 4, and the sealing element 11 invariably prevents leakage of hydraulic fluid between the outlet 4 and the portion of chamber 6 to the right of the piston 2.

When the spring in the left-hand portion of the chamber 6 is free to overcome the pressure of fluid in the right-hand portion of the chamber 6 so that the piston 2 is free to slide from the left-hand to the right-hand position of FIG. 1, the sealing element 10 slides along the two-part rounded portion 5 of the internal surface 1A, i.e., across the outlet 4, to thereupon assist the sealing element 11 in preventing leakage of fluid between the outlet 4 and the right-hand portion of the chamber 6 while permitting hydraulic fluid to flow from the outlet 4 into the discharge opening 7 (e.g., a customary port in the housing or body of a valve having a piston-like reciprocable valving element).

The sealing elements 10 and 11 can be made of polyacrylate rubber, unfoamed polyurethane or any other suitable elastically deformable material. The grooves 8 and 9 for the sealing elements 10 and 11 are or can be dimensioned in the customary way so as to ensure that portions of the respective sealing elements extend beyond the peripheral surface 2A and are in adequate sealing engagement with the internal surface 1A. The rounding of those portions of the surface 2A which flank the grooves 8 and 9 need not be pronounced; it can but need not be as pronounced as the rounding of those portions (5) of the internal surface 1A which flank the outlet 4 of the plenum chamber 3.

When the piston 2 is held in the left-hand end position which is shown in the upper part of FIG. 1, the sealing element 10 is located in the left-most portion of its groove 8 under the pressure of fluid which fills the outlet 4 as well as the annular clearance between the surfaces 1A, 2A intermediate the sealing elements 10, 11. The sealing element 11 is kept in the rightmost portion of its groove 9. The sealing element 10 is in sealing engagement with the adjacent portion of the surface 1A, with the surface at the bottom of the groove 8, and with the surface at the left-hand side of the groove 8. The sealing element 11 is in sealing engagement with the adjacent portion of the surface 1A, with the surface at the bottom of the groove 9, and with the surface at the right-hand side of the groove 9.

If the pressure in the right-hand portion of the chamber 6 is relaxed, the spring or springs in the left-hand portion of the chamber 6 are free to dissipate energy and to push the piston 2 to the position which is shown in the lower portion of FIG. 1. The sealing element 10 moves axially of the cylinder 1 from the left-hand portion into the right-hand portion of the groove 8 during movement past the outlet 4 of the plenum chamber 3, and more particularly during movement to the right beyond the outlet 4. The sealing elements 10 and 11 then cooperate to jointly seal the outlet 4 from the right-hand portion of the chamber 6.

It has been found that repeated movements of the sealing element 10 past the outlet 4 do not result in rapid wear and/or more serious damage to the sealing ring. The reason is that a film of hydraulic fluid always remains between the sealing element 10 and the right-hand part of the rounded portion 5 of the surface 1A when the sealing element 10 moves to the right, and that a film of hydraulic fluid remains between the left-hand part of the rounded portion 5 and the sealing element 10 when the latter moves to the left. Such films act not unlike layers of lubricant (even if the hydraulic fluid is not a genuine lubricant).

In the valve of FIG. 1, the plane of the sealing element 10 and its groove 8 is parallel to the plane of the slot-shaped outlet 4 and extends at right angles to the directions of reciprocatory movement of the piston 2 in the chamber 6 of the cylinder 1.

It has been found that, even though the preferably circumferentially complete slot-shaped outlet 4 enables the sealing element 10 to expand into the outlet on its way from the position which is shown in the upper part to the position which is shown in the lower part of FIG. 1, actual expansion of the sealing element 10 radially outwardly is not pronounced at all. Experiments were carried out with a hydraulic fluid which was maintained at a pressure of 50 bar, and it was ascertained that the extent of radial expansion of the sealing element 10 into the outlet 4 during movement from the position in the upper part to the position in the lower part of FIG. 1 was actually negligible. The valve which was used in the above experiments was made of PLEXIGLAS (Trademark) and the sealing element 10 was an O-ring. The pressure was raised to 350 bar and the piston was caused to perform 100,000 strokes between its two positions. The O-ring (which was expected to stand a total of not more than 5,000 stress tests) was still intact.

Figure 2:
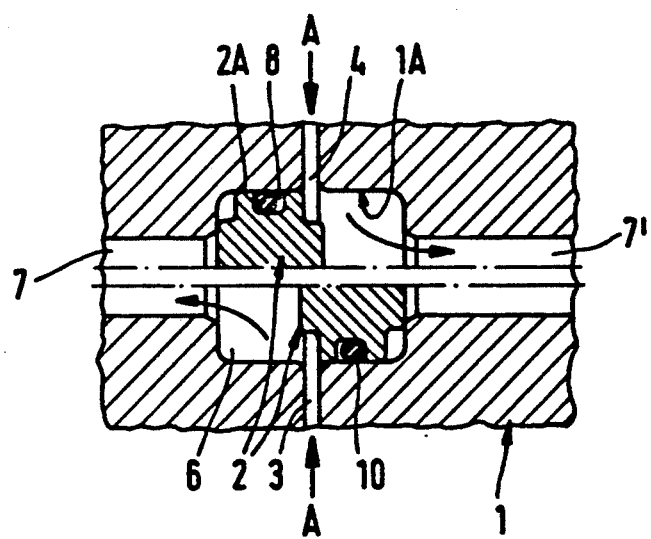
FIG. 2 is a similar fragmentary sectional view of a second hydraulic valve wherein the inner component carries a single annular sealing element and the outer component has two discharge openings one of which communicates with the outlet in one axial position and the other of which communicates with the outlet in the other axial position of the inner component.

FIG. 2 shows a portion of a modified hydraulic valve wherein the piston 2 has an at least partially cylindrical external or peripheral surface 2A with a single circumferential groove 8 for a single sealing element 10 in the form of an O-ring. The chamber 6 of the cylinder 1 is bounded by an at least partly cylindrical internal surface 1A and the cylinder is formed with two discharge openings 7, 7' at opposite axial ends of the piston 2. When the piston 2 is held in the axial position which is shown in the upper part of FIG. 2, the outlet 4 of the plenum chamber 3 in the cylinder 1 is free to communicate with the right-hand discharge opening 7'. This discharge opening is sealed from the outlet 4 when the piston 2 is caused to move to the right-hand end position which is shown in the lower part of FIG. 2. The outlet 4 then supplies hydraulic fluid to the left-hand discharge opening 7. The means for moving the piston 2 between the two end positions of FIG. 2 is not specifically shown in the drawing. For example, the piston 2 can be made of or can contain a ferromagnetic material and can be pushed or pulled between its two end positions in response to energization or deenergization of one or more electromagnets.

The manner in which portions of the peripheral surface 2A are rounded in the region of the groove 8 and the manner in which portions of the internal surface 1A are rounded in the region of the outlet 4 is or can be the same as described with reference to FIG. 1. When the piston 2 is held in the left-hand end position, the sealing element 10 is located in the left-hand portion of its groove 8, and this sealing element moves into the right-hand portion of the groove 8 in response to a movement of the piston 2 to the right-hand end position.

The reasons for longer useful life of the sealing element 10 of FIG. 2 are the same as those described in connection with the sealing element 10 of FIG. 1.

Figure 3:
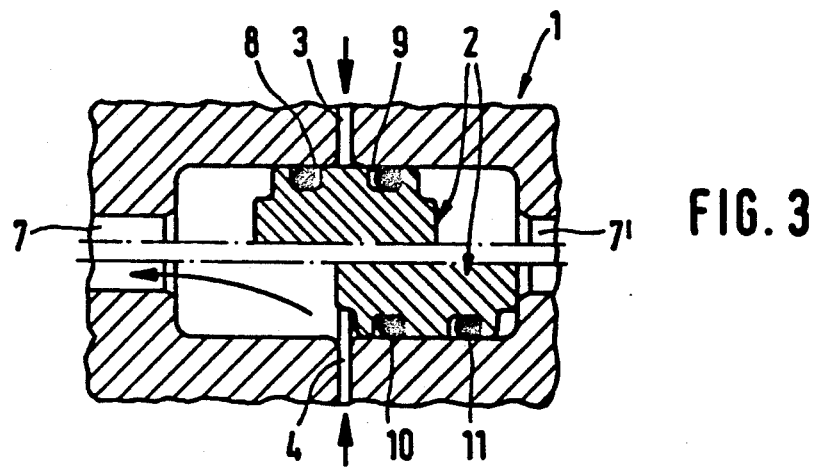
FIG. 3 is a fragmentary axial sectional view of a third valve which constitutes a modification of the valves of FIGS. 1 and 2 and wherein the sealing position of the inner component is an intermediate or median position, one of the two open positions being shown in the lower half of FIG. 3.

FIG. 3 shows a portion of a third hydraulic valve which combines certain features of the valves of FIGS. 1 and 2. Thus, the piston 2 is reciprocable between two end positions, the same as described in connection with the piston 2 of FIG. 2, and this piston has two circumferentially extending grooves 8, 9 for two sealing elements 10, 11, the same as in the embodiment of FIG. 1. The cylinder 1 has two discharge openings 7 and 7'.

Figure 4:
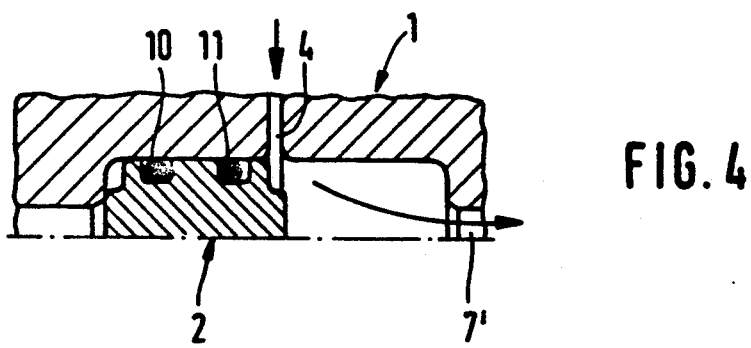
FIG. 4 shows the lower half of FIG. 3 with the inner component in the other open position.

The upper part of FIG. 3 shows the piston 2 in a median or central position in which the sealing elements 10, 11 are disposed at opposite sides of the outlet 4 of the plenum chamber 3 and these sealing elements seal the outlet 4 from the discharge openings 7 and 7', respectively. The lower part of FIG. 3 shows the piston 2 in the right-hand end position in which the sealing elements 10, 11 are disposed at the right-hand side of the outlet 4 and the latter can supply hydraulic fluid to the discharge opening 7. FIG. 4 shows the piston 2 of the valve of FIG. 3 in the other (left-hand) end position in which the sealing elements 10, 11 are located to the left of the outlet 4 and the latter can supply hydraulic fluid to the discharge opening 7'. The outlet 4 which is shown in FIGS. 3 and 4 is or resembles an annular slot, the same as in the cylinders 1 of FIGS. 1 and 2.

Figure 5:
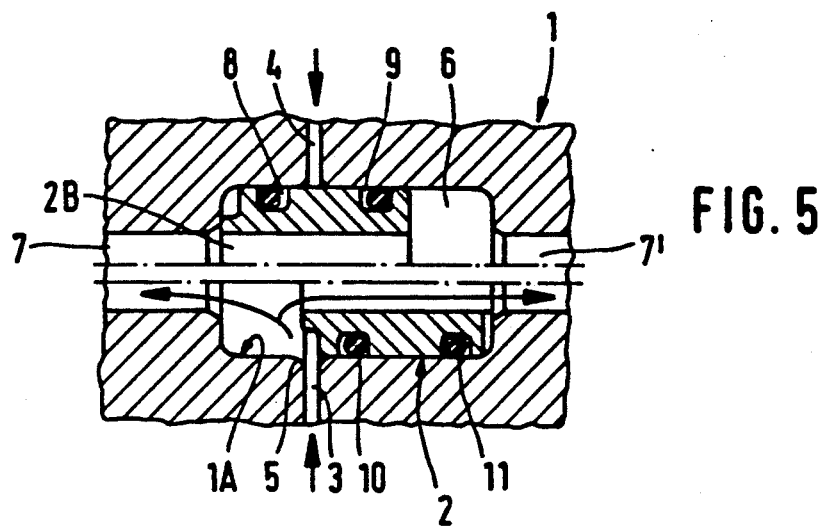
FIG. 5 is a fragmentary axial sectional view of a fourth valve which constitutes a modification of the valve of FIG. 2.

FIG. 5 shows a portion of a fourth hydraulic valve wherein the cylinder 1 is or can be identical with the cylinder of FIGS. 3 and 4, i.e., it has an annular slot-like inlet 4 and two discharge openings 7 and 7' disposed at opposite axial ends of the piston 2 in the chamber 6. The outlet 4 of the plenum chamber 3 is nearer to the discharge opening 7 than to the discharge opening 7', and the axial length of the piston 2 is selected in such a way that the latter maintains the sealing elements 10, 11 at opposite sides of the outlet 4 when the piston assumes a left-hand end position which is shown in the upper part of FIG. 5. When the piston 2 is caused to assume a right-hand end position which is shown in the lower part of FIG. 5 (e.g., in response to energization or deenergization of one or more electromagnets), an axial passage 2B of the piston 2 enables the latter to establish communication between the outlet 4 and both discharge openings (7, 7') of the cylinder 1. The left-hand sealing element 10 moves from the left-hand portion of its groove 8 into the right-hand portion of such groove in response to axial movement of the piston 2 from the left-hand to the right-hand end position, and the sealing element 10 returns into the left-hand portion of the groove 8 as soon as it reaches, or advances to the left beyond, the left-hand part of the rounded portion 5 of the internal surface 1A of the cylinder 1.

Figure 6:
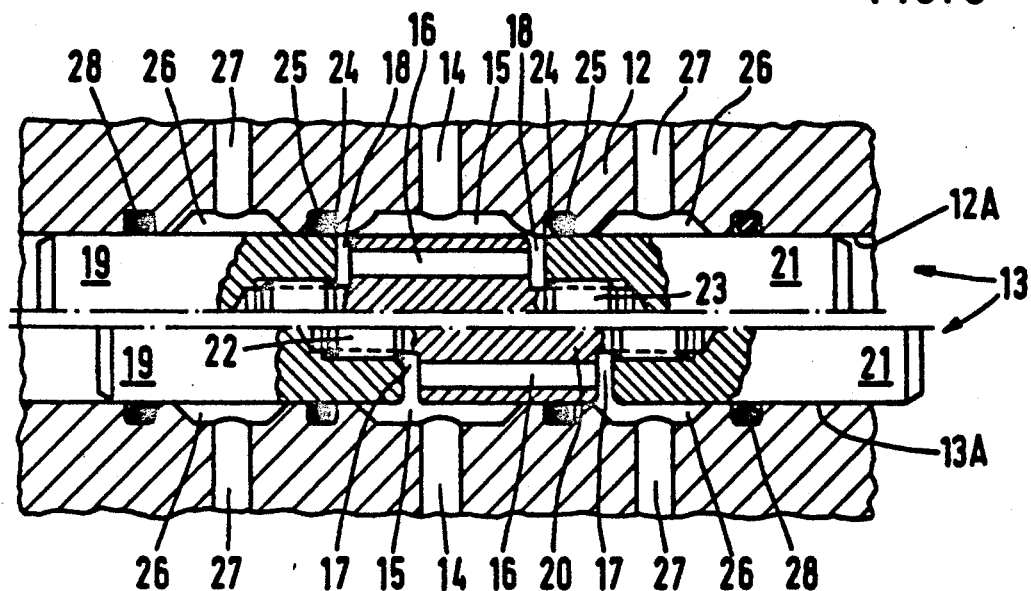
FIG. 6 is an axial sectional view of a fifth valve, the inner component being shown in a sealing position in the upper half and in one of several open positions in the lower half of the Figure.

FIG. 6 shows certain parts of a fifth hydraulic valve wherein the outer component 12 is an elongated cylinder having an at least partially cylindrical internal surface 12A and the inner component is an elongated piston 13 having an at least partially cylindrical external or peripheral surface 13A. The inner component 13 can be said to constitute a double acting or twin piston.

The cylinder 12 has an inlet 14 which admits pressurized hydraulic fluid from a suitable source (e.g., a pump) into an annular recess 15 which is machined into or otherwise formed in the internal surface 12A. The recess 15 communicates with two axially spaced-apart substantially slot-shaped inlets-outlets 18 which are provided in the peripheral surface 13A of the piston 13 and whose inner end portions are communicatively connected to each other by at least one substantially axially parallel passage or channel 16 in the piston 13. When the piston 13 assumes a central or median position shown in the upper part of FIG. 6, the radially outermost portions of the inlets/outlets 18 can but need not always communicate with the recess 15. The internal surface 12A of the cylinder 12 has a first annular groove 24 to the left of the left-hand inlet/outlet 18 (hereinafter called port for short) and a second annular groove 24 to the right of the right-hand port 18. The grooves 24 receive portions of annular sealing elements 25. Those portions of the surface 13A which flank the ports 18 are preferably rounded or substantially rounded (chamfered, convex or similarly shaped) for the reasons which were described in connection with FIG. 1. The radially inner portions 17 of the ports 18 can be said to constitute plenum chambers.

The piston 13 comprises three sections 19-21 which are separably connected to each other by connecting means including threaded fasteners. The leftmost section 19 of the piston 13 is located to the left of the left-hand port 18 and has a tapped axial bore for a threaded fastener 22 in the form of a stub provided at the left-hand end of the median piston section 20. The median section 20 further comprises a second threaded fastener 23 extending into a tapped bore in the rightmost section 21 of the piston 13. The median section 20 of the piston 13 is located between the two slot-like ports 18.

The grooves 24 are inwardly adjacent two discrete annular recesses 26 which are machined into or are otherwise formed in the internal surface 12A of the cylinder 12 and communicate with radially outwardly extending bores or holes 27 for evacuation of hydraulic fluid from the valve. Each recess 26 is located between one of the grooves 24 and a further groove for an additional sealing element 28.

When the piston 13 is held in the median position shown in the upper part of FIG. 6, the ports 18 function as inlets and admit pressurized hydraulic fluid from the annular recess 15 into the plenum chambers 17 and passage or passages 16. The left-hand sealing element 25 is then located in the leftmost portion of its groove 24, and the right-hand sealing element 25 is located in the right-hand portion of its groove 24. These sealing elements are in sealing engagement with the peripheral surface 13A as well as with two surfaces in their respective grooves 24 to effectively seal the recess 15 and the inlet 14 of the cylinder 12 from the two discharge openings each of which includes a recess 26 and the respective bore or bores 27.

If the piston 13 is then caused to move to a right-hand position which is shown in the lower part of FIG. 6, the left-hand port 18 continues to act as an inlet because it communicates with the recess 15 and admits pressurized hydraulic fluid into the plenum chambers 17 as well as into the passage or passages 16. The right-hand port 18 then acts as an outlet in that it admits pressurized hydraulic fluid into the right-hand discharge opening including the respective recess 26 and the corresponding bore or bores 27. The right-hand sealing element 25 is located somewhere in the center of its respective groove 24 because it is acted upon by pressurized fluid from both sides. The right-hand sealing element 28 is located in the rightmost portion of its groove in the internal surface 12A of the cylinder 12. The rate of fluid flow into the right-hand bores 27 can be regulated by regulating the extent to which the right-hand port (outlet) 18 registers with the right-hand recess 26.

The manner in which portions of the surface 13A bounding the radially outermost portions of the ports 18 are rounded and the manner in which portions of the surface 12A bounding the grooves 24 are rounded is preferably the same as described in connection with the outlet 4 and groove 8 of the valve which is shown in FIG. 1. As mentioned above, when the piston 13 is caused to assume the position which is shown in the lower part of FIG. 6, the right-hand sealing element 25 can be located midway between the radial surfaces flanking the respective groove 24 because the pressure at one side of such sealing element (in the recess 15) matches or approximates the pressure in the right-hand recess 26.

Figure 8:
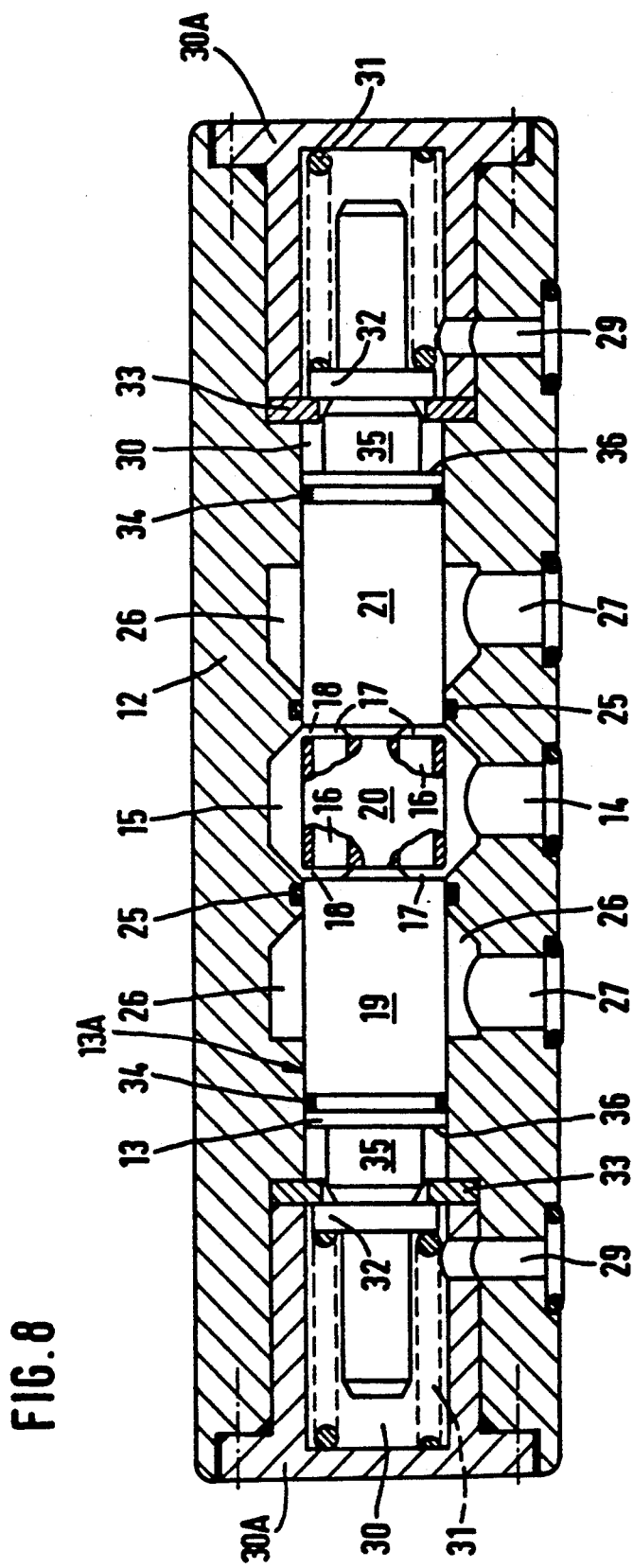
FIG. 8 is an axial sectional view of a seventh valve.

The piston 13 is further movable to a left-hand end position (not shown in FIG. 6) which is a mirror image of the position shown in the lower part of FIG. 6 and in which the left-hand port 18 acts as an outlet which admits pressurized fluid into the left-hand recess 26. The piston 13 can be moved between its three positions by a pressurized fluid, by one or more springs or by electromagnetic or other means, not specifically shown. For example, the means for moving the piston 13 can be designed in a manner as shown in FIG. 8. The cylinder 12 constitutes the housing or body of a valve and its end portions contain inserts 30A defining spaces 30 which can receive a pressurized fluid by way of inlets 29. The spaces 30 contain coil springs 31 which react against the bottom walls of the respective inserts 30A and bear against retainers 32 abutting the respective axial ends of the piston 13. The cylinder 12 further contains two stops in the form of washers 33 which extend into the chamber of the cylinder and serve to arrest the respective retainers 32 in predetermined axial positions. If the admission of pressurized fluid to the one or the other chamber 30 is interrupted, the springs 31 are free to expand and to bias the respective retainers 32 against the adjacent stops 33. This ensures that the piston 13 is maintained in the median position shown in the upper part of FIG. 6. The peripheral surface 13A of the piston 13 is formed with grooves for sealing elements 34 which seal the respective spaces 30 from the neighboring recesses 26 of the cylinder 12 so as to prevent leakage of hydraulic fluid into the spaces 30 as well as to prevent leakage of a fluid medium from the spaces 30 into the adjacent recesses 26. The free end portions 35 of sections 19 and 21 of the piston 13 constitute stubs which can extend through the central apertures of the respective stops 33 into abutment with the respective retainers 32.

If a pressurized fluid is thereupon admitted into the left-hand space 30, such fluid acts upon the left-hand annular surface 36 of the piston 13 and shifts the latter axially to the end position which is shown in the lower part of FIG. 6. The right-hand spring 31 yields to the combined bias of the left-hand spring 31 and pressurized fluid in the left-hand space 30 to allow such axial shifting of the piston 13. If the piston 13 is to be moved to its left-hand end position, the pressure in the left-hand space 30 is reduced and the pressure in the right-hand space 30 is raised so that the pressurized fluid acts upon the right-hand annular surface 36 of the piston and such fluid assists the right-hand spring 31 in overcoming the resistance of the left-hand spring 31.

The width of the outlets 18 can be altered in a number of ways. For example, the sections 19, 21 can be arrested and held in selected axial positions with reference to the section 20 by radially extending grub screws or the like. It is also possible to install one or more distancing elements between the sections 19, 20 and 21 and to thus select the desired width of the outlets 18. For example, if the sealing elements are O-rings, the width of the outlets 18 can approximate 75 percent of the cord packing. However, it is equally within the purview of the invention to provide the internal surface of the outer component or the external surface of the inner component with one or more slot-shaped outlets each having a width which exceeds the diameter of the sealing element or is only a small or minute fraction of such diameter.

Figure 9:
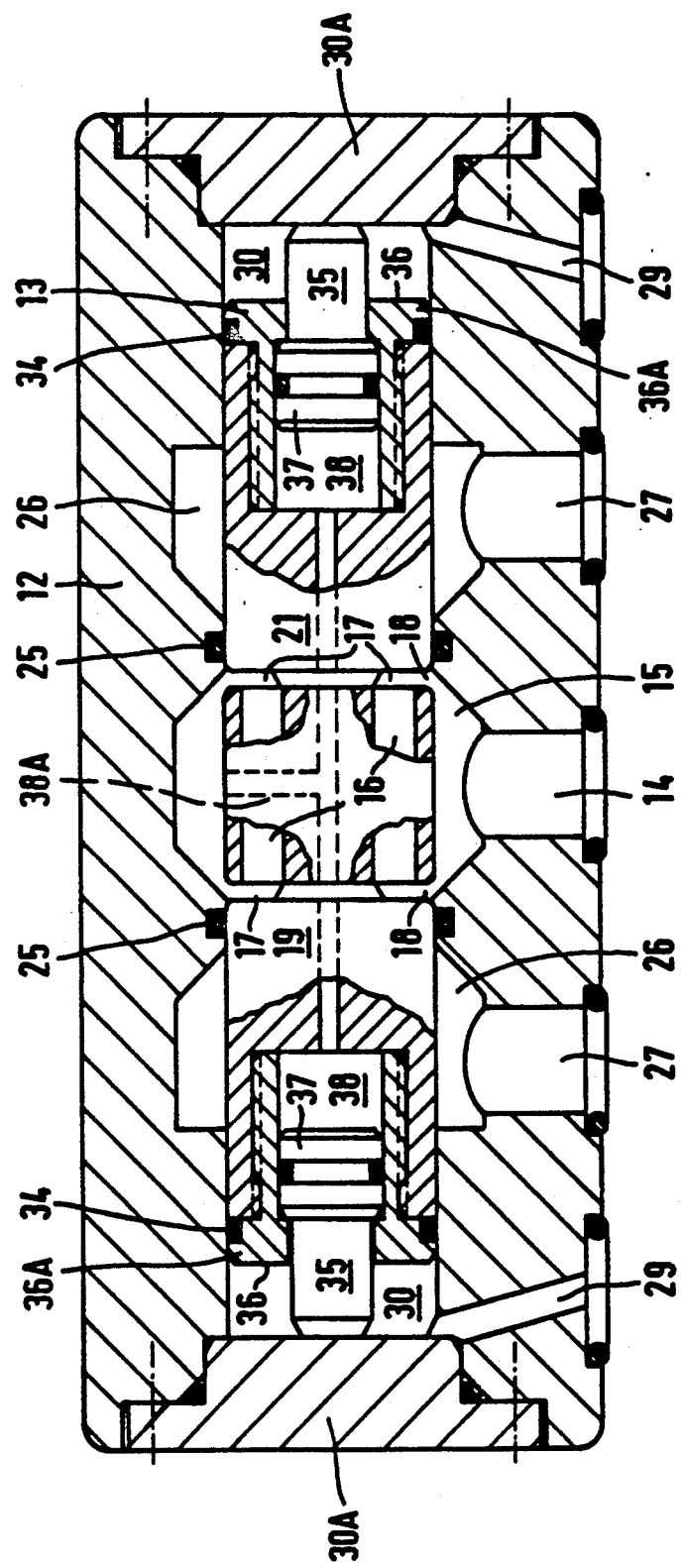
FIG. 9 is an axial sectional view of a further valve.

FIG. 9 shows a modification of the valve of FIGS. 6 and 8. The coil springs 31 of FIG. 8 are omitted and the two end sections 19, 21 of the piston 13 carry axially movable studs 35 constituting the piston rods of plungers 37 reciprocable in cylinder chambers 38 provided therefor in the respective sections 19 and 21. The cylinder 12 has two inlets 29 for admission of pressurized fluid into the respective spaces 30 so that the fluid can act upon the respective annular surfaces 36 of the piston 13. The surfaces 36 are provided on externally threaded inserts 36A which are threadedly connected with the respective sections 19, 21 and have peripheral grooves for sealing elements 34 serving to seal the spaces 30 from the respective cylinder chambers 38 and recesses 26.

The cylinder chambers 38 receive pressurized fluid from the recess 15 of the cylinder 12 by way of channels 38A in the piston 13. When the pressure in the left-hand space 30 is raised and the pressure in the right-hand space 30 is reduced, the piston 13 moves to the right to assume a position corresponding to that shown in the lower part of FIG. 6. Inversely, the piston 13 is caused to assume its left-hand end position in response to admission of pressurized fluid into the right-hand space 30; at such time, the left-hand plunger 37 is caused to penetrate deeper into the respective cylinder chamber 38 against the opposition of pressurized fluid in the channel or channels 38A.

When the pressure in the left-hand space 30 matches the pressure in the right-hand space 30 and is less than the pressure in the cylinder chambers 38, hydraulic fluid in the channel or channels 38A maintains the piston rods 35 in their fully extended positions (shown in FIG. 9) in which the piston 13 is centered between the inserts 30A and its ports 18 act as inlets which admit pressurized hydraulic fluid from the inlet 14 into the plenum chambers 17 and into the passage or passages 16. The areas of the end faces of plungers 37 in their respective cylinder chambers 38 are smaller than the areas of the respective annular surfaces 36 so that the pressure in one of the spaces 30 need not exceed the pressure in the cylinder chambers 38 in order to shift the piston 13 to the one or the other end position.

Figure 7:
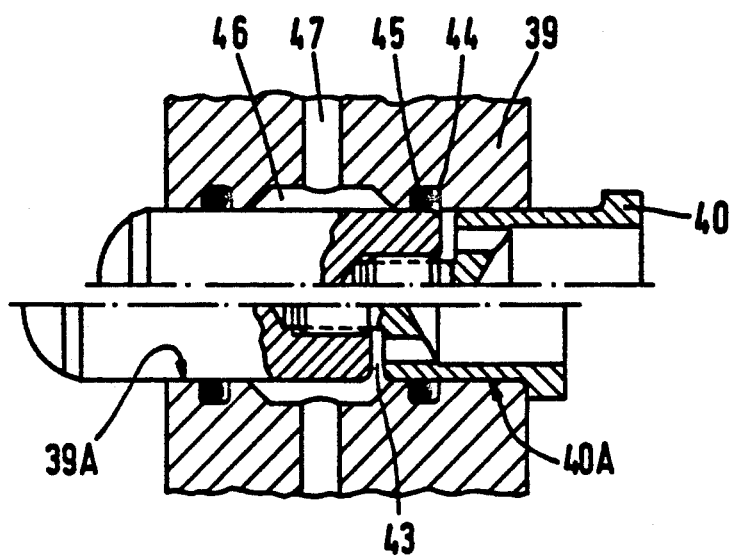
FIG. 7 is a fragmentary axial sectional view of a pressure relief valve, the inner component being shown in its sealing position in the upper half and in its open position in the lower half of the Figure.
Figure 10:
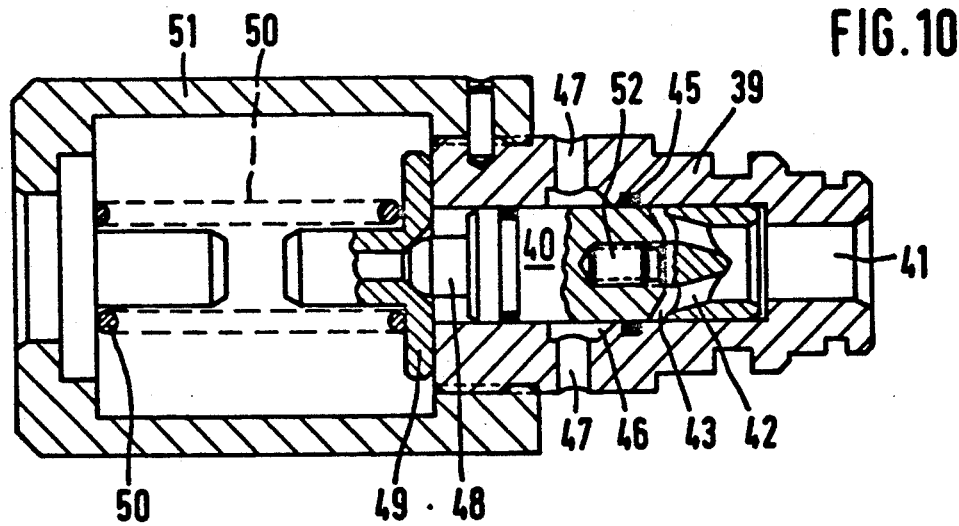
FIG. 10 is an axial sectional view of a pressure relief valve constituting a slight modification of the valve of FIG. 7.

FIG. 7 shows a portion of a pressure relief valve with a cylinder 39 and a piston 40. The latter is movable in the cylinder 39 axially in response to the application of fluid pressure to its left-hand end face (see FIG. 10) whereby the slot-shaped outlet 43 in the peripheral surface 40A of the piston 40 moves toward a position of register with an annular recess 46 provided in the internal surface 39A of the cylinder 39 and forming part of a discharge opening which includes one or more radially extending bores or slots 47 in the cylinder 39. The relief valve of FIGS. 7 and 10 is operative to prevent escape of pressurized hydraulic fluid when the piston 40 assumes the axial position which is shown in the upper part of FIG. 7 as well as in FIG. 10 and in which the outlet 43 is located to the right of the recess 46. When the pressure at the inlet 41 of the cylinder 39 rises sufficiently, the piston 40 is moved axially to the position which is shown in the lower part of FIG. 7 so that the outlet 43 establishes communication between the inlet 41 and the discharge opening 46, 47 of the cylinder 39 and the pressurized fluid can escape, e.g., back into a tank, into a sump or into any other source of fluid from which the fluid can be drawn by a pump or the like.

The reference character 42 denotes in FIG. 10 a plenum chamber which communicates with the inlet 41 as well as with the outlet 43. The latter can be bounded, at least in part, by two parts of a substantially rounded portion of the peripheral surface 40A. FIG. 10 further shows that the outlet 43 of the piston 40 need not extend substantially radially of the cylinder 39 but can be inclined so that it forms a substantially frustoconical slot which permanently communicates with the plenum chamber 42 and inlet 41 and can communicate with the recess 46 when the piston 40 reaches the axial position which is shown in the lower part of FIG. 7 in response to compression of a coil spring 50 in a casing 51 which is separably connected to the cylinder 39 and contains a retainer 49 which normally assumes the right-hand end position of FIG. 10 but can be displaced by the left-hand end portion 48 of the piston 39 when the pressure of fluid in the inlet 41 and chamber 42 reaches a preselected maximum permissible value.

The internal surface 39A of the cylinder 39 has a circumferential groove 44 for a ring-shaped sealing element 45 which performs the function of the sealing element 10 of FIG. 1 and normally seals the outlet 43 from the recess 46.

The piston 40 is assembled of two coaxial sections which are separably connected to each other by a threaded fastener 52.

Figure 11:
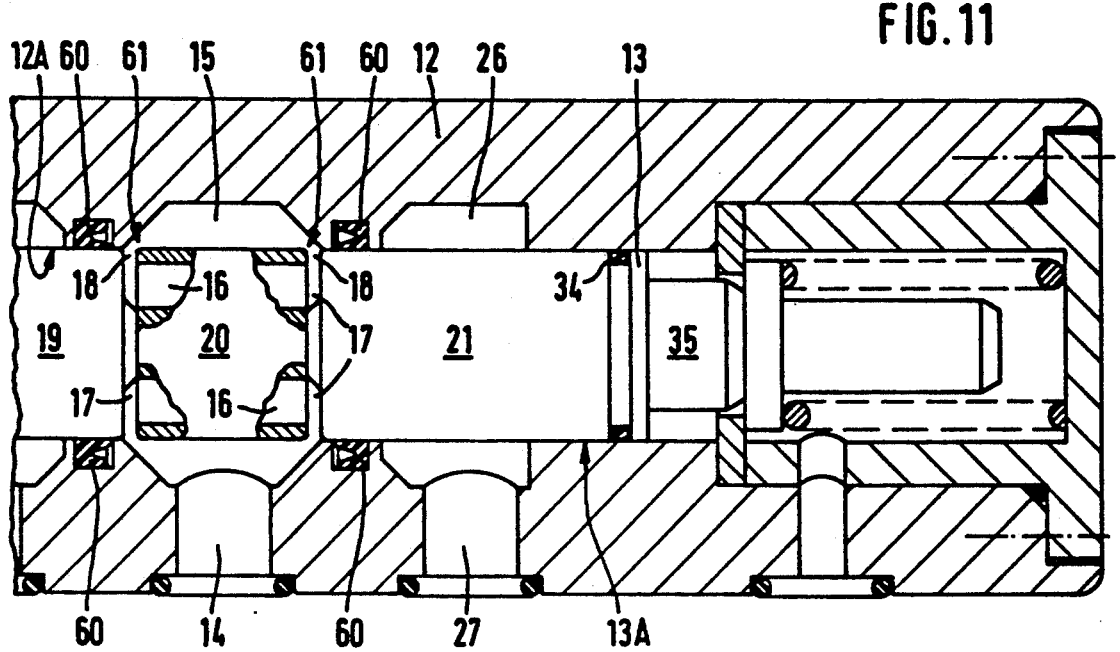
FIG. 11 is an enlarged fragmentary axial sectional view of the valve of FIG. 8 but employing modified sealing elements.

FIG. 11 shows a portion of a hydraulic valve which is similar to the valve of FIG. 8 except that the sealing elements 25 (O-rings) of FIG. 8 are replaced with annular lip seals 60. The lips of the seals 60 extend toward the recess 15 in the internal surface 12A of the cylinder 12. FIG. 11 further shows that those portions (61) of the external surface 13A of the piston 13 which are immediately adjacent the axial ends of the outlets 18 are rounded to facilitate the travel of the outlets 18 over the lip seals 60. Such rounding can be achieved by chamfering the respective portions of the peripheral surface 13A at an angle of 15-20 degrees with reference to the axis of the piston 13. When the piston 13 is caused to move to the left, the right-hand part of the rounded surface portion 61 flanking the left-hand outlet 18 engages the adjacent inner lip of the left-hand lip seal 60 and deflects such lip upwardly so that the outlet 18 can advance along and beyond the left-hand lip seal 60. Analogously, the inner lip of the right-hand lip seal 60 is deflected upwardly by one part of the rounded portion 61 of the surface 13A in the region of the right-hand outlet 18 of FIG. 11 when the piston 13 is caused to leave the illustrated central or median position and to slide in the cylinder 12 toward the right-hand end position. The rounded portions 61 ensure that the inner lips of the seals 60 are deflected radially outwardly even if such inner lips exhibit a rather pronounced tendency to bend radially inwardly.

One of the lip seals 60 of FIG. 11 can be used in the valve of FIGS. 7 and 10 as a substitute for the O-ring 45. The lips of such lip seal would extend in a direction to the right, as seen in FIG. 7 or 10.

Lip seals can be used with advantage in lieu of O-rings when the pressure of hydraulic fluid is very high and if the inner component is received in the outer component with a reasonably large amount of play. In such valves, a conventional O-ring would have to be used in conjunction with a so-called supporting ring which would extend across the gap between the external surface of the inner component and the internal surface of the outer component. The useful life of supporting rings is relatively short, especially when the hydraulic fluid is maintained at an elevated pressure. The reason is that the supporting ring undergoes extensive wear in response to repeated engagement with surface portions flanking a slot-shaped outlet.

Lip seals of the type shown in FIG. 11 were subjected to extensive tests in the same manner as described above in connection with O-rings. It has been found that, in spite of their lips, lip seals can stand very long periods of frequent use without appreciable wear or other damage. This is attributed to the aforediscussed selection of inclination (preferably between 14 and 20 degrees) of the portions 61 of peripheral surface 13A in the regions at both sides of each outlet 18. Such inclination of the surface portions 61 ensures that the upsetting action upon the inner lips of the seals 60 is much less pronounced than expected. The action of the inclined surface portions 61 upon the inner lips of the seals 60 is not unlike that of auxiliary tools in the form of assembling or mounting sleeves which are used for the mounting of lip seals. It is desirable to install the lip seals with little or no initial stressing, i.e., with much less initial stressing than is customary and permissible for O-rings. In other words, the lip seals 60 can be deformed primarily or exclusively by the pressurized hydraulic fluid. The above considerations apply for lip seals having symmetrical or asymmetrical cross-sectional outlines.

Figure 12:
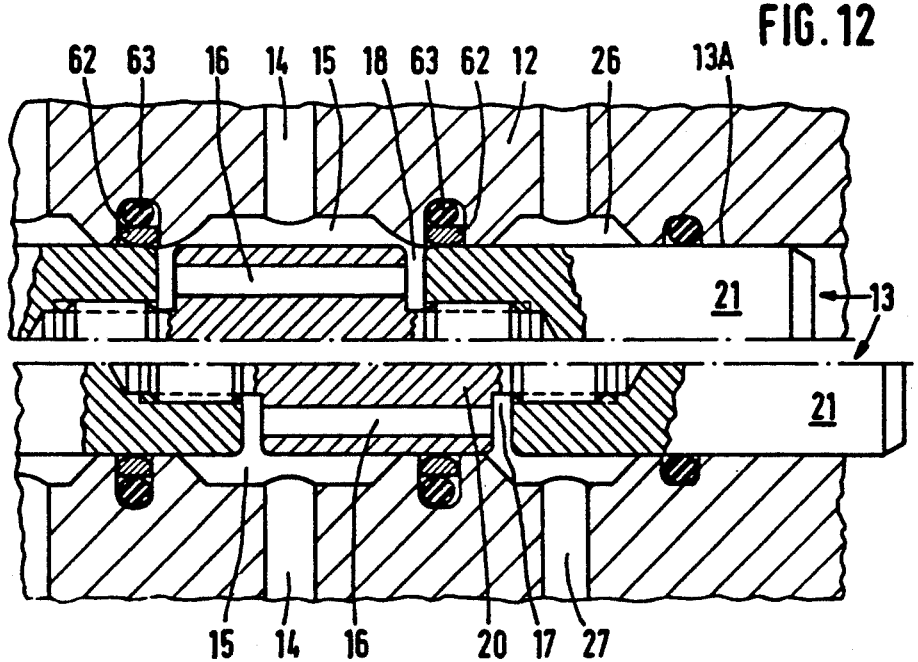
FIG. 12 is an enlarged axial sectional view of a portion of the valve of FIG. 6 but with modified (composite) sealing elements.

FIG. 12 shows a portion of a valve wherein the lip seals 60 of FIG. 11 are replaced with composite annular seals each of which includes a smooth inner ring 62 and an elastic outer ring 63 serving to bias the inner ring toward the peripheral surface 13A of the piston 13. In all other respects, the valve of FIG. 12 can be identical with the valve of FIG. 8 or 9.

The inner rings 62 can be made of a synthetic plastic material whose coefficient of friction is low or very low, and such inner rings can be provided with smooth or very smooth piston-contacting surfaces. When used in conjunction with the associated elastic outer rings 63, they act not unlike O-rings.

Those portions of the peripheral surface 13A which flank the cutlets 18 are preferably rounded, chamfered or similarly shaped in the same way as described in connection with the embodiments of FIGS. 1 to 11. This further prolongs the useful life of the composite sealing elements 62, 63. However, such rounding or chamfering constitutes a precautionary measure, i.e., it is not as desirable or necessary as in the case of the utilization of sealing elements in the form of O-rings or lip seals.

Rounding or chamfering is not necessary where the sealing elements are caused to travel past one or more slot-shaped or otherwise configurated openings for non-pressurized hydraulic fluids. In other words, such rounding or chamfering is particularly desirable and advantageous when the sealing element or elements move past one or more outlets which are connected to plenum chambers or when the outlets of plenum chambers move past sealing elements.

Figure 13:
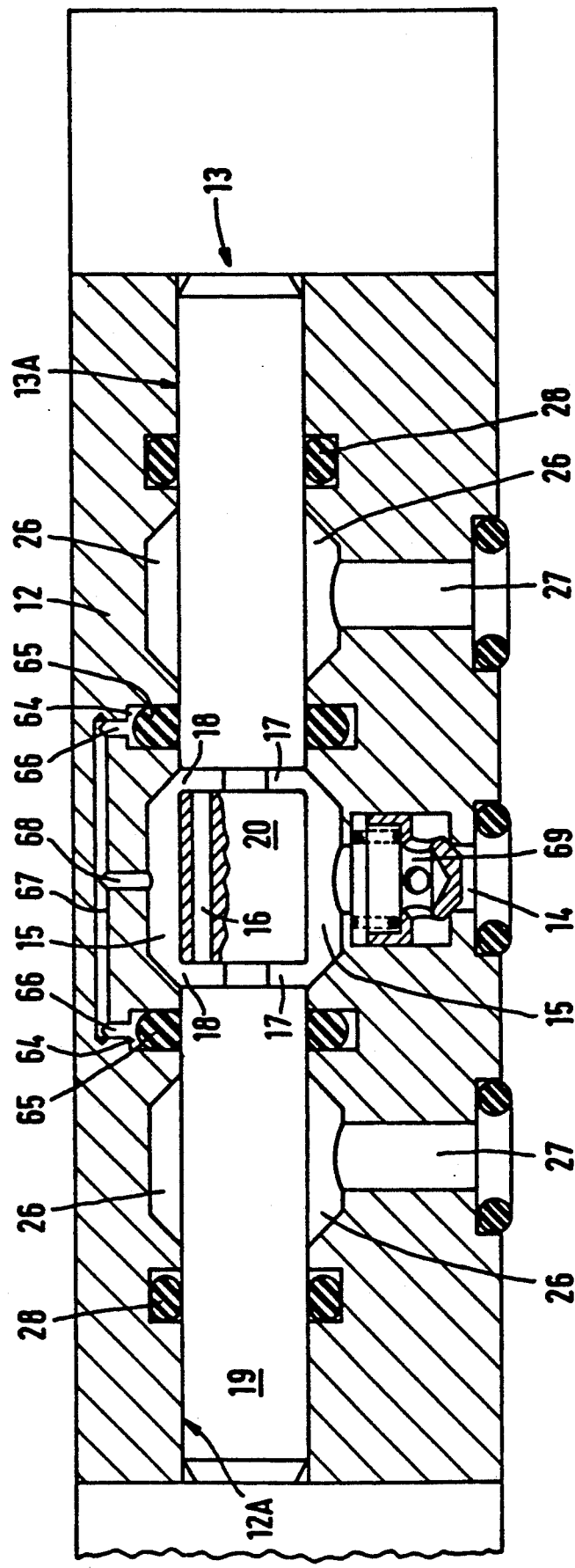
FIG. 13 is an axial sectional view of a further valve.

The hydraulic valve of FIG. 13 constitutes a further modification of the valve which is shown in FIG. 6. The grooves 24 for the sealing elements 25 of FIG. 6 are replaced with different grooves 64 for sealing elements in the form of O-rings 65. The sealing elements 25 of FIG. 6 are biased by the surfaces at the bottoms of the respective grooves 24 so that the innermost portions of the sealing elements 25 are compelled to bear against the peripheral surface 13A of the piston 13. In addition, the sealing elements 25 of FIG. 6 are acted upon by hydraulic fluid in the axial direction of the piston 13, namely by the fluid which penetrates into the gap between the surfaces 12A and 13A. On the other hand, the grooves 64 which are shown in FIG. 13 have radially outermost portions which are located radially outwardly of the respective sealing elements 65 and are connected to the recess 15 by connecting channels 66, 67 and 68 so that hydraulic fluid in the radially outermost portions of the grooves 64 acts upon the respective sealing elements 65 and biases them radially inwardly toward sealing engagement with the peripheral surface 13A of the piston 13. It will be seen that each of the sealing elements 65 is acted upon radially and axially by hydraulic fluid. Radially acting fluid in the outermost portions of the grooves 64 ensures that the wear upon the radially innermost portions of the sealing elements 65 cannot affect their sealing action. A spring-biased check valve 69 is provided in the channel means connecting the inlet 14 of the cylinder 12 with the channels 66–68 to prevent the hydraulic fluid from flowing in directions from the radially outermost portions of the grooves 64 back to the source P (e.g., a pump) of hydraulic fluid.

FIG. 13 shows the piston 13 in a median position in which the sealing elements 65 seal the recess 15 from the two discharge openings including the recesses 26 and the corresponding bores 27. The hydraulic fluid acts upon the sealing elements 65 to urge them radially inwardly by way of the channels 66–68 and the outermost portions of the respective grooves. 64. At the time, hydraulic fluid acts upon the sealing elements 65 in the clearance between the surfaces 12A, 13A so that each of these sealing elements is acted upon and performs a sealing action not unlike a customary O-ring. The manner in which the radially innermost portions of the sealing elements 65 cooperate with the rounded portions of the surface 13A in the regions of the outlets 18 is the same as or analogous to that described in connection with FIG. 1.

If the pressure in the bores 27 and recesses 26 of the cylinder 12 shown in FIG. 6 were to rise above the pressure in the inlet 14, the sealing elements 25 would migrate in their grooves 24 toward the recess 15 and would be squeezed into the adjacent outlets 18 not later than when the piston 13 would begin to perform an axial movement away from the median position shown in the upper part of FIG. 6. On the other hand, if the pressure in the bores 27 and recesses 26 of the cylinder 12 which is shown in FIG. 13 were to rise above the fluid pressure in the inlet 14, the axial positions of the sealing elements 65 in their rather narrow grooves 64 would remain unchanged because these grooves are dimensioned in such a way that the sealing elements 65 therein can be displaced radially inwardly or outwardly but cannot move therein in the axial direction of the piston 13. Therefore, a rise of fluid pressure in the clearance between the surfaces 12A, 13A as a result of a rise of pressure in the recesses 26 above the pressure in the inlet 14 and recess 15 of the cylinder 12 could not cause any axial shifting of the sealing elements 65. All that happens or can happen if the pressure in the just mentioned clearance between the surfaces 12A, 13A exceeds the pressure in the channels 66–68 and in the radially outermost portions of grooves 64 is that the pressurized fluid in the clearance will lift the radially innermost portions of the sealing elements 65 and will be free to flow from the recesses 26 into the recess 15. The check valve 69 prevents the flow of such pressurized fluid from the recess 15 back to the source P so that the fluid entering the recess 15 as a result of the flow of some fluid along the peripheral surface 13A of the piston 13 and past the sealing elements 65 is simply trapped in the space including the recess 15, plenum chambers 17 and channel or channels 16. The construction which is shown in FIG. 13 ensures that the sealing elements 65 cannot be squeezed into the adjacent outlets 18 in any axial position of the piston 13. This is due to the fact that the sealing elements 65 have freedom to expand radially outwardly into the outermost portions of the respective grooves 64.

The valve of FIG. 13 can be modified by providing the outlets 18 in the internal surface 12A of the cylinder 12 and by providing the grooves 64 for the sealing elements 65 in the peripheral surface 13A of the piston 13.

The likelihood of a reversal of the direction of flow of hydraulic fluid will arise when the valve is used in certain types of machines, for example, in hydraulically operated props for use in underground excavations. The pressure of hydraulic fluid in the recesses 26 can rise drastically in the event of a collapse of rock, ore and/or other material at a level above a mine prop which receives pressurized hydraulic fluid by way of a valve embodying the present invention. The utilization of sealing elements 65 in grooves corresponding to the grooves 64 and the provision of paths for the flow of pressurized fluid from the source to the radially outermost portions of the grooves 64 but not in the opposite direction, as well as the establishment of a path for the flow of highly pressurized fluid from the recesses 27 into the recess 15 will effectively prevent immediate or premature destruction of the sealing elements even under the above outlined adverse circumstances when the pressure in the recesses 26 exceeds the pressure in the recess 15.

Figure 14:
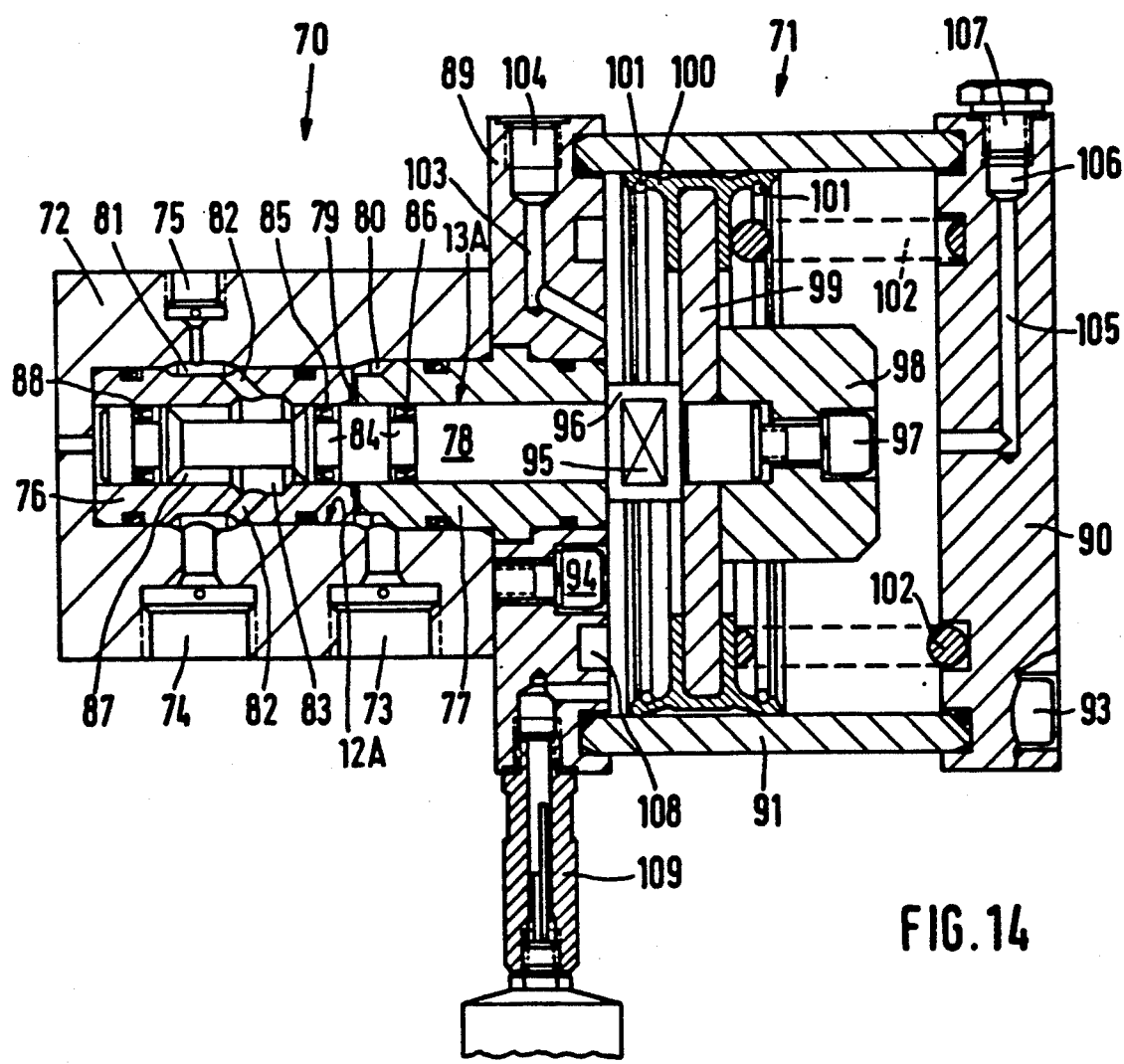
FIG. 14 is an axial sectional view of a safety valve.

Referring to FIG. 14, there is shown a valve 70 which is combined with a pneumatically operated device 71 for moving an inner component or piston 78 with reference to an outer component or cylinder 76+77. The piston 78 is indirectly biased by a coil spring 102 which normally tends to ensure that a slot-shaped outlet 79 remains sealed from discharge openings 74, 75.

The cylinder is installed in an outer valve housing or body 72 which has an inlet 73 for admission of pressurized hydraulic fluid from a suitable source (e.g., a pump). The housing 72 is further provided with the two discharge openings 74, 75 each of which can supply pressurized hydraulic fluid to a discrete consumer. The cylinder is assembled of two coaxial sections 76, 77 which are installed in the housing 72. The end face of one of the sections 76, 77 has one or more axially extending ribs so that the assembled sections 76, 77 define the aforementioned slot-shaped outlet 79. The internal surface 12A of the composite cylinder 76–77 has a pair of rounded portions which flank the radially innermost portion of the outlet 79. The radially outermost portion of the outlet 79 communicates with an annular plenum chamber 80 which receives pressurized hydraulic fluid from the inlet 73 of the housing 72. The peripheral surface of the composite cylinder 76–77 and/or the internal surface of the housing 72 is provided with an additional annular chamber 81 which communicates with the discharge openings 74 and 75. The chamber 81 further communicates (by way of one or more inclined bores or holes 82) with a wide annular recess 83 in the internal surface 12A of the cylinder 76–77.

The peripheral surface 13A of the piston 78 is provided with two circumferentially complete grooves 84 for annular lip seals 85 and 86 which engage the adjacent portions of the surface 12A in the cylinder 76–77 and are disposed at opposite sides of the outlet 79 in the illustrated sealing position of the piston 78. When the piston 78 is moved to its open position (this entails a movement of the piston 78 to the right, as seen in FIG. 14), the left-hand lip seal 85 travels past and beyond the outlet 79 so that the latter can supply hydraulic fluid to a circumferential recess 87 of the piston 78 and hence to the annular recess 83 which communicates with the chamber 81 and discharge openings 74, 75 by way of the bore or bores 82. The lip seal 85 then assists the lip seal 86 in sealing the outlet 79 from the gaseous fluid medium in the device 71. The peripheral surface 13A of the piston 78 is provided with an additional groove for an annular lip seal 88 which seals the chamber 81 from the left-hand portion of the cylinder chamber for the piston 78.

The device 71 comprises a pneumatic cylinder and piston unit having two relatively thick end walls 89, 90 and a shell 91 which extends between the end walls 89, 90. Screws 93 (only one shown) or other suitable fasteners are provided to maintain the casing 89, 90, 91 of the device 71 in assembled condition. The end wall 89 is affixed to the housing 72 by a set of screws 94 (only one shown) or by other suitable fasteners. The section 77 of the composite cylinder 76-77 extends through the end wall 89, and the right-hand portion of the piston 78 extends axially beyond the section 77 and hence into the interior of the casing 89-91. The right-hand end portion of the piston 78 has an enlarged portion or boss 96 with one or more axially parallel flats 95. The boss 96 cooperates with a clamping and pressure transmitting member 98 to clamp a large-diameter plunger 99 which is held in the illustrated position with reference to the piston 78 by a screw 97 which couples the pressure transmitting member 98 to the boss 96. The periphery of the plunger 99 is surrounded by a ring-shaped sealing member 100 having two sealing lips which are biased against the internal surface of the shell 91 by elastic split rings, by coil springs 101 or by other suitable resilient elements. The coil spring 102 is used to bias the piston 78 in a direction to the left (i.e., to the sealing position of FIG. 14) through the medium of the plunger 99. The coil spring 102 reacts against the end wall 90. The leftward axial movement of the piston 78 is terminated when the boss 96 comes into abutment with the adjacent end face of the cylinder section 77.

The device 71 further comprises means for admitting a pressurized gaseous fluid into the chamber between the end wall 89 and the plunger 99. To this end, the end wall 89 is formed with a bore 103 which serves to supply pressurized gaseous fluid and receives such fluid by way of a socket 104 which can receive the nipple at one end of a hose (not shown) the other end of which is connected to a source of pressurized gaseous fluid. The piston 78 assumes its open position when the pressure transmitting member 98 abuts the end wall 90. The end wall 90 is formed with a bore 105 leading to a socket 106 for the nipple of a hose which can connect the chamber at the right-hand side of the plunger 99 with a source of pressurized gaseous fluid. In FIG. 14, the socket 106 is sealed by a plug 107. The right-hand chamber of the device 71 will receive pressurized gaseous fluid via bore 105 if the spring 102 is transferred into the chamber between the plunger 99 and the end wall 89, i.e., if the spring 102 is to permanently bias the piston 78 to its open position. The right-hand end face of the end wall 19 has an annular recess 108 for one or more end convolutions of the spring 102 if the latter is transferred from the right-hand chamber into the left-hand chamber of the device 71.

FIG. 14 further shows an outlet 109 which serves for evacuation of condensate from the left-hand chamber of the device 71. Such outlet is provided in the end wall 90 if the spring 102 is transferred into the left-hand chamber of the device 71.

An important advantage of all illustrated embodiments is that it is possible to considerably reduce the dimensions of the improved valve because the provision of one or more slot-like and preferably circumferentially complete (or nearly complete) outlets allows for a considerable reduction of the resistance which the valve offers to the flow of a hydraulic fluid. Such valve can be used in conjunction with one or more additional valves of similar or different design and with associated conduits, and all of the valves can be installed in a plate which then constitutes a common valve housing or body for the valves. The valve can be actuated automatically by remote control in response to appropriate signals and can constitute, in conjunction with one or more additional valves and conduits, a component of a composite flow sequence controlling arrangement in mining and many other types of machines.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A hydraulic valve comprising an outer component having an at least partially cylindrical internal surface and an inner component having an at least partially cylindrical external surface adjacent said internal surface, said external surface having at least one slot-shaped outlet and said inner component defining two plenum chambers in communication with said outlet and at least one passage connecting said chambers, said internal surface having two spaced-apart grooves and two recesses flanking said grooves, and further comprising a sealing element disposed in each of said grooves and contacting said external surface, at least one of said components being movable with reference to the other of said components between at least one first position in which said sealing elements seal said outlet from said recesses and at least one second position in which said outlet communicates with one of said recesses, said internal surface further having an annular inlet disposed between said grooves and communicating with said chambers in the first position of said one component so that the chambers can be filled with a pressurized hydraulic fluid.

2. The valve of claim 1, wherein said sealing elements include an O-ring.

3. The valve of claim 1, wherein said outlet is a circumferentially complete annular slot.

4. The valve of claim 1, wherein said external surface has a substantially rounded portion adjacent to at least one side of said outlet.

5. The valve of claim 1, wherein said internal surface has a substantially rounded portion adjacent at least one side of said groove.

6. The valve of claim 1, wherein said one component includes two sections flanking said outlet and means for connecting said sections to each other.

7. The valve of claim 1, wherein said outer component includes a cylinder and said inner component comprises a piston which is reciprocable in said cylinder.

8. The valve of claim 1, wherein said outlet and said grooves are disposed in three substantially parallel planes and said one component is movable in directions substantially at right angles to such planes.

* * * * *